United States Patent
Li

(10) Patent No.: US 9,897,017 B2
(45) Date of Patent: Feb. 20, 2018

(54) EFFICIENT CONTROL ALGORITHM FOR START-STOP OPERATION OF A REFRIGERATION UNIT POWERED BY ENGINE

(75) Inventor: Wenhua Li, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 659 days.

(21) Appl. No.: 13/981,261

(22) PCT Filed: Dec. 6, 2011

(86) PCT No.: PCT/US2011/063476
§ 371 (c)(1),
(2), (4) Date: Oct. 8, 2013

(87) PCT Pub. No.: WO2012/102787
PCT Pub. Date: Aug. 2, 2012

(65) Prior Publication Data
US 2014/0023519 A1    Jan. 23, 2014

Related U.S. Application Data

(60) Provisional application No. 61/436,392, filed on Jan. 26, 2011.

(51) Int. Cl.
*F02D 29/04* (2006.01)
*B60H 1/00* (2006.01)
(Continued)

(52) U.S. Cl.
CPC ............ *F02D 29/04* (2013.01); *B60H 1/322* (2013.01); *B60H 1/3226* (2013.01);
(Continued)

(58) Field of Classification Search
CPC ....... F02D 41/083; F02D 29/04; B60H 1/322; B60H 2001/3273; B60H 1/3226;
(Continued)

(56) References Cited

U.S. PATENT DOCUMENTS

| 4,419,866 A | 12/1983 | Howland |
| 4,478,274 A | 10/1984 | Naganoma et al. |

(Continued)

FOREIGN PATENT DOCUMENTS

EP    1046543 A2    10/2000

OTHER PUBLICATIONS

International Search Report and Written Opinion for related International Application No. PCT/US11/63476; dated Mar. 15, 2012.

*Primary Examiner* — Kun Kai Ma
(74) *Attorney, Agent, or Firm* — Cantor Colburn LLP

(57) ABSTRACT

A refrigeration unit and a method for controlling same during start-stop operation is provided. The refrigeration unit may include an engine operable between at least a low engine speed and a high engine speed, a compressor operatively coupled to the engine, and a controller operatively coupled to each of the engine and the compressor. The controller may be configured to operate the engine at a reduced low speed during a delay period, extend the delay period based on the reduced low speed, increase a displacement capacity of the compressor based on the extended delay period, and operate the engine at a reduced high speed.

17 Claims, 3 Drawing Sheets

(51) Int. Cl.
  *B60H 1/32*  (2006.01)
  *F02D 41/02*  (2006.01)
  *F02D 41/08*  (2006.01)
  *F25B 27/00*  (2006.01)
  *F25B 49/02*  (2006.01)
  *F25D 29/00*  (2006.01)
  *F02N 11/08*  (2006.01)

(52) U.S. Cl.
  CPC ......... *F02D 41/021* (2013.01); *F02D 41/083* (2013.01); *F25B 27/00* (2013.01); *F25B 49/025* (2013.01); *F25D 29/003* (2013.01); *B60H 2001/3238* (2013.01); *B60H 2001/3273* (2013.01); *F02N 11/0811* (2013.01); *F02N 2200/0812* (2013.01); *F25B 2500/26* (2013.01); *F25B 2600/0253* (2013.01)

(58) Field of Classification Search
  CPC ........... B60H 2002/3238; F25B 49/025; F25B 2600/0253; F25B 2500/26; F02N 11/0811
  See application file for complete search history.

(56) References Cited

U.S. PATENT DOCUMENTS

| | | | |
|---|---|---|---|
| 4,496,286 A * | 1/1985 | Gagnon | F02B 37/18 123/275 |
| 4,706,470 A * | 11/1987 | Akazawa | F04B 35/045 417/417 |
| 4,903,502 A | 2/1990 | Hanson et al. | |
| 4,926,651 A * | 5/1990 | Noguchi | B60H 1/3208 62/133 |
| 5,065,587 A | 11/1991 | Howland et al. | |
| 5,140,826 A | 8/1992 | Hanson et al. | |
| 5,161,383 A | 11/1992 | Hanson et al. | |
| 5,197,670 A | 3/1993 | Hanson et al. | |
| 5,275,011 A | 1/1994 | Hanson et al. | |
| 5,317,998 A * | 6/1994 | Hanson | F02N 11/0803 123/179.4 |
| 5,331,821 A * | 7/1994 | Hanson | B60H 1/322 62/133 |
| 5,456,088 A | 10/1995 | Hanson et al. | |
| 5,557,941 A | 9/1996 | Hanson et al. | |
| 6,044,651 A * | 4/2000 | Reason | B60H 1/3208 62/158 |
| 6,688,125 B2 | 2/2004 | Okamoto et al. | |
| 6,889,502 B1 * | 5/2005 | French | F02D 41/0007 123/559.1 |
| 7,275,916 B2 * | 10/2007 | Smith | F04B 35/002 417/280 |
| 2002/0062183 A1 * | 5/2002 | Yamaguchi | B60K 6/46 701/22 |
| 2002/0078700 A1 * | 6/2002 | Kelm | B60H 1/3222 62/236 |
| 2003/0131612 A1 * | 7/2003 | Wakisaka | B60H 1/3222 62/133 |
| 2003/0200759 A1 * | 10/2003 | Iwanami | B60H 1/3222 62/133 |
| 2003/0233839 A1 * | 12/2003 | Hirose | B60H 1/3205 62/186 |
| 2007/0131408 A1 * | 6/2007 | Zeigler | B60H 1/00378 165/240 |
| 2008/0306664 A1 * | 12/2008 | Guo | F16H 61/66 701/54 |
| 2009/0038322 A1 | 2/2009 | Senf Jr. et al. | |
| 2009/0133419 A1 * | 5/2009 | Matsuno | B60P 3/20 62/239 |
| 2010/0236265 A1 * | 9/2010 | Higuchi | B60H 1/3216 62/228.4 |
| 2010/0242510 A1 * | 9/2010 | Kadle | B60H 1/00735 62/127 |
| 2010/0261576 A1 * | 10/2010 | Ishido | F16H 61/66259 477/43 |
| 2010/0289273 A1 * | 11/2010 | Steele | F25B 49/025 290/40 B |
| 2011/0067419 A1 * | 3/2011 | Aoyagi | B60H 1/005 62/133 |
| 2012/0198869 A1 * | 8/2012 | Morita | B60H 1/3208 62/126 |

\* cited by examiner

EFFICIENT CONTROL ALGORITHM FOR START-STOP OPERATION OF A REFRIGERATION UNIT POWERED BY ENGINE

CROSS-REFERENCE TO RELATED APPLICATIONS

This application is a 35 U.S.C §371 U.S. national stage filing of International Patent Application No. PCT/US11/63476 filed on Dec. 6, 2011 claiming priority under the Paris Convention and 35 U.S.C. §119(e) to U.S. Provisional Patent Application Ser. No. 61/436,392 filed on Jan. 26, 2011.

FIELD OF THE DISCLOSURE

The present disclosure generally relates to refrigeration units, and more particularly, relates to a control scheme of a refrigeration unit being powered by an engine.

BACKGROUND OF THE DISCLOSURE

Refrigeration systems are generally used to maintain a relatively low temperature within a designated area. Refrigeration systems serve to remove heat from a substantially enclosed area and transfer the heat to an environment external to the enclosed area. Refrigeration systems are commonly used in association with residential and commercial food refrigerators, air-conditioning units in homes and automobiles, as well as with refrigerated cargos of ships and trucks. Mobile refrigeration systems used to condition frozen and perishable loads in cargo spaces of trucks and trailers are referred to as transport refrigeration units.

A typical transport refrigeration unit is associated with transportable cargo or an insulated trailer. Such mobile transport refrigeration units are generally powered by a mobile power source, such as a combustion engine, to cool the temperature within a trailer to a desired setpoint temperature or a range thereof. In addition to cooling, transport refrigeration units must also be sufficiently capable of maintaining a specific range of trailer temperatures even in the presence of contrasting ambient temperatures and load conditions. This can be accomplished by continuously driving the compressor off of the engine. However, continuous operation of the compressor and the engine also requires continuous consumption of fuel.

Accordingly, some transport refrigeration units provide a start-stop mode of operation as a fuel efficient alternative to the continuous mode of operation. Specifically, the engine is operated at a low engine speed for a predetermined runtime or delay period so as to operate the associated compressor and provide a first stage of cooling. After the delay period, the engine is operated at a high engine speed to drive the compressor during a second stage of cooling. Once the trailer is cooled to the desired setpoint temperature during the second cooling stage, the engine is shut off until further cooling is required. While such modes of operation provide some conservation of fuel, there is still room for improvement.

Start-stop modes of operating a transport refrigeration unit provide some conservation of fuel with respect to continuous modes of operation. However, the processes within currently existing start-stop operations are not optimized for efficiency. For example, each of the low and high engine speeds can be modified to conserve more fuel and/or to perform better cooling. The runtime between the first and second stages of cooling, or the duration of the delay period, can also be modified to compensate for any reduction or increase in the low and high engine speeds. Additionally, the displacement capacity of the compressor can be modified to further compensate for any changes in the low and high engine speeds. Currently existing implementations of start-stop operations do not take such modifications into consideration.

The disclosed systems and methods are directed at overcoming one or more of the deficiencies set forth above.

SUMMARY OF THE DISCLOSURE

In accordance with one aspect of the disclosure, a method for controlling a refrigeration unit being powered by an engine and having a compressor is provided. The method may operate the engine at a reduced first speed during a delay period, extend the delay period based on the reduced first speed, increase a displacement capacity of the compressor based on the extended delay period, and operate the engine at a reduced second speed, wherein the reduced first speed may be less than the reduced second speed.

In accordance with another aspect of the disclosure, a method for controlling a refrigeration unit being powered by an engine and having a compressor during start-stop operation is provided. The method may start the engine to a reduced low engine speed during a delay period, extend the delay period based on the reduced low engine speed, increase a displacement capacity of the compressor based at least partially on the reduced low engine speed and the extended delay period, operate the engine at a reduced high engine speed once the extended delay period is exceeded, and stop the engine once a setpoint temperature is reached.

In accordance with yet another aspect of the disclosure, a refrigeration unit is provided. The refrigeration unit may include a variable speed engine operable between at least a low engine speed and a high engine speed, a compressor operatively coupled to the engine, and a controller operatively coupled to each of the engine and the compressor. The controller may be configured to operate the engine at a reduced low speed during a delay period, extend the delay period based on the reduced low speed, increase a displacement capacity of the compressor based on the extended delay period, and operate the engine at a reduced high speed.

Other advantages and features will be apparent from the following detailed description when read in conjunction with the attached drawings.

It should be understood that the drawings are not necessarily to scale and that the disclosed embodiments are sometimes illustrated diagrammatically and in partial views. In certain instances, details which are not necessary for an understanding of the disclosed methods and systems or which render other details difficult to perceive may have been omitted. It should be understood, of course, that this disclosure is not limited to the particular embodiments illustrated herein.

DETAILED DESCRIPTION OF THE DISCLOSURE

Figure 1:
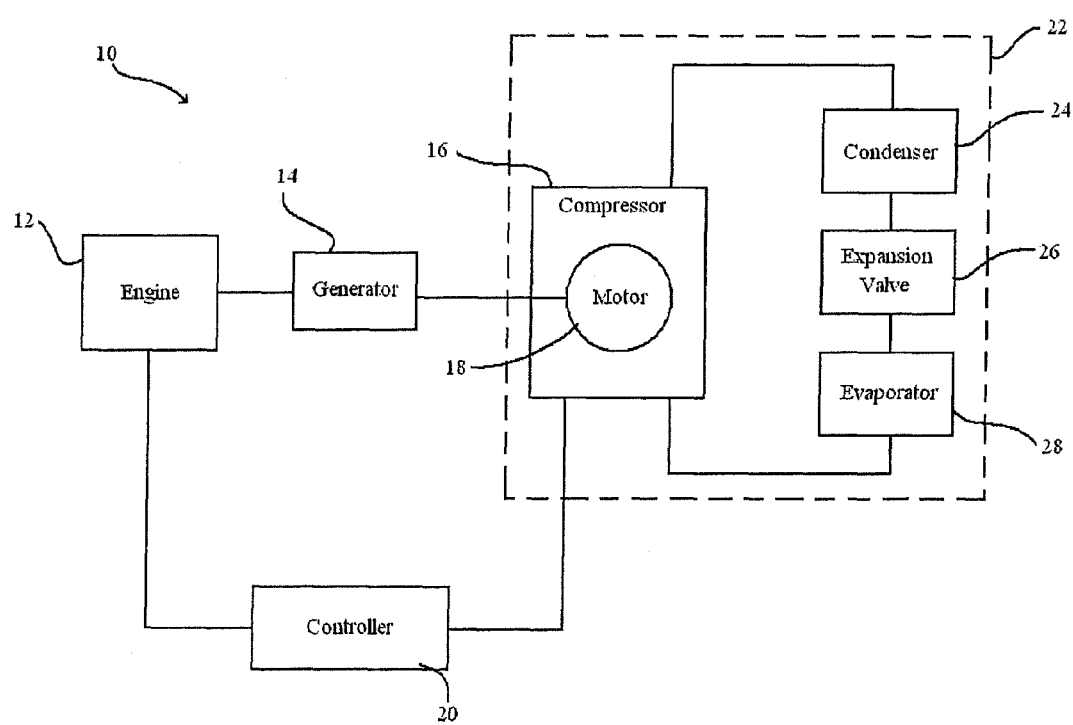
FIG. 1 is a diagrammatic view of one exemplary refrigeration unit being powered by an engine and constructed in accordance with the teachings of the present disclosure.

Turning to FIG. 1, a schematic diagram of an exemplary refrigeration unit 10 is provided. As shown, the refrigeration unit 10 may be powered by an engine 12, for example, a variable speed combustion engine, or any other suitable power source commonly used in the art and operable at variable speeds. Furthermore, the refrigeration unit 10 may be implemented as a transport refrigeration unit, or any other type of refrigeration unit that may receive power from an engine or a comparable power source.

Still referring to FIG. 1, an output of the engine 12 may be operably coupled to a generator 14 via drive belts, or the like. Specifically, the torque that is generated by the engine 12 may be used to at least partially rotate a rotor of the generator 14 within an associated stator so as to generate power in the form of, for example, alternating current (AC). The refrigeration unit 10 may further include a compressor 16 having a motor 18. An output of the generator 14 may be operatively coupled to the compressor motor 18 and configured to supply electrical power thereto. The refrigeration unit 10 may additionally include a controller 20 that is in electrical communication with each of the engine 12 and the compressor 16 and configured to, for example, control engine speed, compressor displacement, and the like.

The refrigeration unit 10 of FIG. 1 may further provide a refrigerating cycle 22 through which a refrigerant may flow and draw heat away from a desired cooling area. In addition to the compressor 16, the refrigerating cycle 22 may include a condenser 24, an expansion valve 26, and an evaporator 28. More specifically, the condenser 24 may be coupled to the expansion valve 26, which may further be coupled to the evaporator 28. The compressor 16 may be coupled to each of the condenser 24 and the evaporator 28. The refrigerant may include, for example, fluorinated carbons, chlorinated carbons, brominated carbons, carbon dioxide, ammonia, ethane-based refrigerants, methane-based refrigerants, water, or any other refrigerant commonly used in the art for the purposes of absorbing and transferring heat. Refrigerants may absorb heat by evaporating and changing its state from a liquid to a gas, for example, at low temperatures and pressures, and release heat by condensing and changing its state from a gas back to a liquid, for example, at higher temperatures and pressures. In the particular embodiment of FIG. 1, the compressor 16 may serve to compress and discharge the high pressure refrigerant through the refrigerating cycle 22. The discharged refrigerant may flow through the condenser 24 and to the expansion valve 26. The expansion valve 26 may then lower the pressure of the refrigerant as the refrigerant flows through the expansion valve 26 and into the evaporator 28. The refrigerant may then be collected back into the compressor 22 to be passed through the refrigerating cycle 22 again.

The refrigeration unit 10 of FIG. 1 may operate in any one of a variety of operating modes in order to achieve a desired setpoint temperature in the least amount of time with the least consumption of fuel. Moreover, the controller 20 may be configured to strategically vary the output speed of the engine 12, and thus, the power supplied to the compressor 16 based on the desired setpoint temperature and the amount of cooling that is required to reach the setpoint temperature. During a continuous mode of operation, for example, the controller 20 may initially engage the engine 12 and the compressor 16 at full load so as to quickly reduce the temperature to the desired setpoint. Once the setpoint temperature is reached, the controller 20 may then operate the engine 12 and the compressor 16 at part load to maintain the setpoint temperature or an approximate range thereabout. During a start-stop mode of operation, for example, the controller 20 may initially start the engine 12 and engage a low engine speed for a predetermined delay period. After the delay period, the controller 20 may operate the engine 12 at a high engine speed to continue cooling until the setpoint temperature is reached. Once the setpoint temperature is achieved, the controller 20 may stop operating the engine 12 until, for instance, additional cooling is required.

Figure 2:
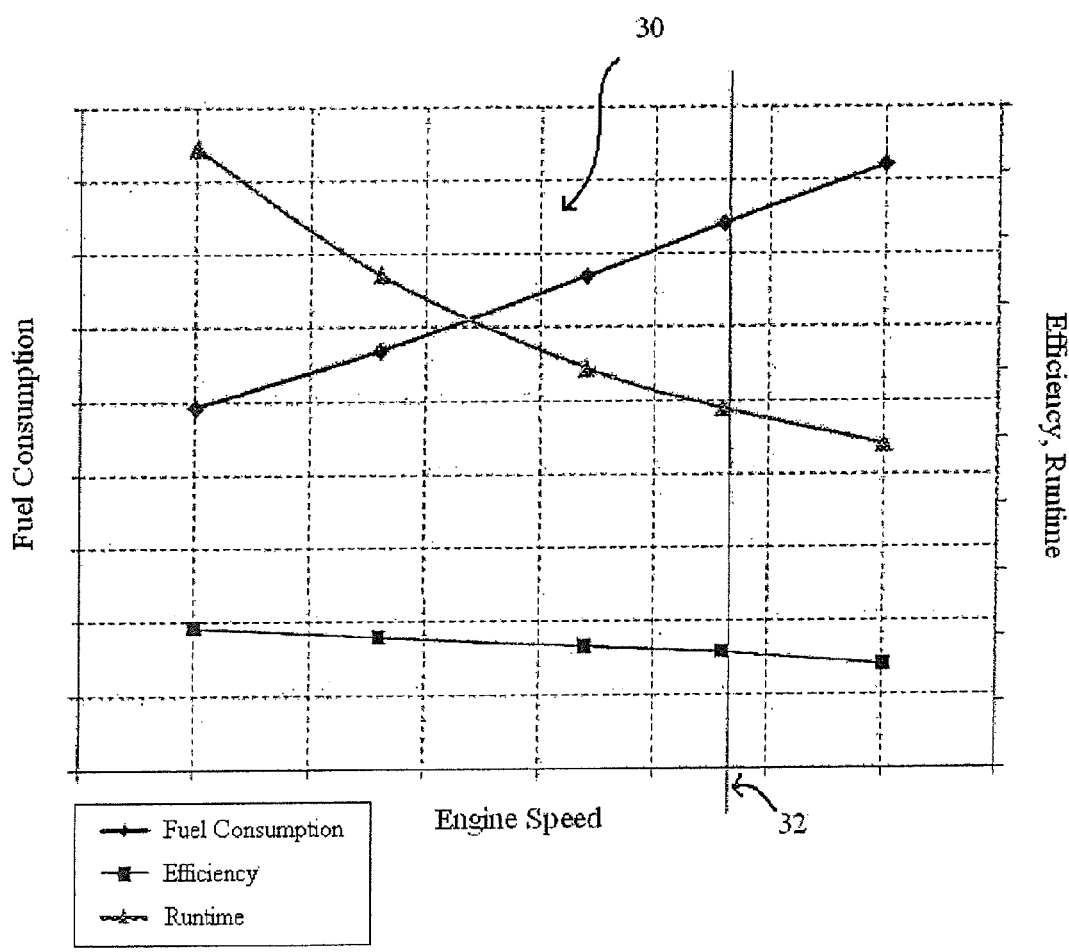
FIG. 2 is a graphical view of a fuel map that may be referenced during start-stop operation of a transport refrigeration unit.

Turning now to FIG. 2, a fuel map 30 characterizing the consumption of fuel during a start-stop mode of operating a refrigeration unit 10 is provided. In particular, the fuel map 30 may provide information pertaining to, for example, the resulting fuel consumption and efficiency of an engine 12 operating at different engine speeds and for different runtimes or delay periods. As shown, a reduction in engine speed may improve the immediate efficiency of the refrigeration unit 10. However, at reduced engine speeds, the engine 12 and the compressor 16 may need to be operated longer, and thus, consume more fuel in order to reach the setpoint temperature. Accordingly, in order to effectively decrease overall fuel consumption and increase the efficiency of the refrigeration unit 10, an optimum point 32 may be assessed from the fuel map 30. Moreover, the optimum point 32 may be indicative of a combination of new reduced engine speeds and new extended runtimes or delay periods at which start-stop operations should be performed in order to realize more efficient but uncompromised cooling for a particular refrigeration unit 10.

Based on such assessments of a fuel map 30, the controller 20 may be able to implement changes to the engine speed and/or the runtime or delay period of the start-stop process so as to minimize fuel consumption and optimize overall efficiency. For example, the controller 20 may be adapted to operate the engine 12 at slower or reduced engine speeds to reduce fuel consumption, and further, extend the delay period to allow the compressor 16 more time to cool to the desired setpoint temperature. The controller 20 may also be configured to change and/or adapt to a change in the displacement capacity of the associated compressor 16 so as to further compensate for the reduced engine speeds and to minimize the time required to reach the desired setpoint temperature. For example, the controller 20 may be configured to increase the effective displacement capacity of the compressor 16 by increasing the operating frequency thereof, and thus, increasing the rate at which refrigerant is compressed and cycled. The controller 20 may also be adapted to operate a compressor 16 with a physically larger displacement capacity.

Figure 3:
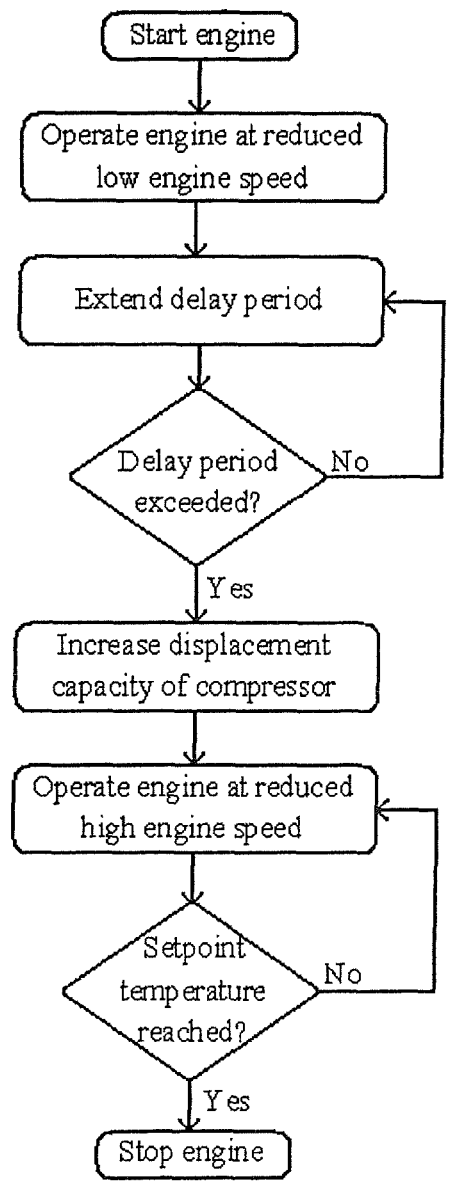
FIG. 3 is a flow chart illustrating an exemplary control algorithm for controlling start-stop operation of a transport refrigeration unit.

Referring to FIG. 3, a flow chart of an exemplary control method or algorithm, for example, by which a controller 20 may be configured to operate a refrigeration unit during a start-stop operation, is provided. As shown, the controller 20 may initially start the engine 12 and operate the engine 12 at a new, reduced low engine speed so as to conserve fuel. The reduced low engine speed as provided by the controller 20 may correspond to, for example, a reduction of approximately 13% or more in the low engine speed. The controller 20 may maintain the reduced low engine speed for a longer runtime, or for an extended delay period, so as to at least partially compensate for the reduced low engine speed. To further compensate for the reduced low engine speed and to minimize the duration of the extended delay period, the controller 20 may effectively provide for an increase in the displacement capacity of the associated compressor 16. For example, the controller 20 may operate the compressor 16 at an increased operating frequency and/or operate a compressor 16 of a larger displacement capacity. The increased displacement capacity of the compressor 16 may correspond to, for example, an increase of approximately 15% or more. Once the extended delay period is exceeded, the controller 20 may engage the engine 12 to operate at a new, reduced high engine speed. As with the reduced low engine speed, the reduced high engine speed may also correspond to, for example, an increase of approximately 13% or more. The controller 20 may maintain the engine 12 at the reduced high engine speed until the setpoint temperature is reached. Once the temperature substantially reaches the desired setpoint, the controller 20 may stop the engine 12 to conserve fuel. Additionally or optionally, the controller 20 may further monitor the temperature within the cargo area of the refrigeration unit 10 and automatically restart the start-stop operation if the temperature exceeds the setpoint or an acceptable range thereof.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for controlling a refrigeration unit being powered by an engine and having a compressor, the engine having a low speed and a high speed, the method comprising:
    starting the engine at an initial first speed lower than the low speed during a delay period;
    extending the delay period based on the initial first speed, the extended delay period being determined from a fuel map of the engine, the fuel map interrelating fuel consumption and efficiency of the engine operating at different engine speeds and for different runtimes, the extended delay period being determined based on a runtime from the fuel map to decrease fuel consumption and increases efficiency;
    increasing a displacement capacity of the compressor based on the extended delay period; and
    operating the engine at a second speed lower than the high speed, the initial first speed being less than the second speed.

2. The method of claim 1 further comprising stopping the engine once a setpoint temperature is reached.

3. The method of claim 1, wherein the engine is operated at the second speed only once the extended delay period is exceeded.

4. The method of claim 1, wherein the initial first speed is at least 13% lower than the low speed and the second speed is at least 13% lower than the high speed.

5. The method of claim 1, wherein the increase in the displacement capacity of the compressor is based on an increase in a physical size of the compressor.

6. The method of claim 1, wherein the increase in the displacement capacity of the compressor is based on an increase in an operating frequency of the compressor.

7. The method of claim 1, wherein the displacement capacity of the compressor is increased by at least 15%.

8. A method for controlling a refrigeration unit being powered by an engine, the engine having a low speed and a high speed, and having a compressor during start-stop operation, the method comprising:
    starting the engine to an initial first speed lower than the low speed during a delay period;
    extending the delay period based on the initial first speed, the extended delay period being determined from a fuel map of the engine, the fuel map interrelating fuel consumption and efficiency of the engine operating at different engine speeds and for different runtimes, the extended delay period being determined based on a runtime from the fuel map to decrease fuel consumption and increases efficiency;
    increasing a displacement capacity of the compressor based at least partially on the initial first speed and the extended delay period;
    operating the engine at a second speed lower than the high speed once the extended delay period is exceeded; and
    stopping the engine once a setpoint temperature is reached.

9. The method of claim 8, wherein the initial first speed is at least 13% lower than the low speed and the second speed is at least 13% lower than the high speed.

10. The method of claim 8, wherein the increase in the displacement capacity of the compressor corresponds to one or more of an increase in a physical size of the compressor and an increase in an operating frequency of the compressor.

11. The method of claim 8, wherein the displacement capacity of the compressor is increased by at least 15%.

12. A refrigeration unit, comprising:
    a variable speed engine operable between at least a low speed and a high speed;
    a compressor operatively coupled to the engine; and
    a controller operatively coupled to each of the engine and the compressor, the controller being configured to start the engine at an initial first speed lower than the low speed during a delay period, extend the delay period based on the initial first speed, the extended delay period being determined from a fuel map of the engine, the fuel map interrelating fuel consumption and efficiency of the engine operating at different engine speeds and for different runtimes, the extended delay period being determined based on a runtime from the fuel map to decrease fuel consumption and increases efficiency, increase a displacement capacity of the compressor based on the extended delay period, and operate the engine at a second speed lower than the high speed.

13. The refrigeration unit of claim 12 further comprising a condenser operatively coupled to the compressor, an expansion valve operatively coupled to the condenser, and an evaporator operatively coupled to the expansion valve.

14. The refrigeration unit of claim 12, wherein the controller is configured to stop the engine once a setpoint temperature is reached.

15. The refrigeration unit of claim 12, wherein the initial first speed is at least 13% lower than the low speed and the second speed is at least 13% lower than the high speed.

16. The refrigeration unit of claim 12, wherein the controller increases the displacement capacity of the compressor based on one or more of an increase in a physical size of the compressor and an increase in an operating frequency of the compressor.

17. The refrigeration unit of claim 12, wherein the controller increases the displacement capacity of the compressor by at least 15%.

* * * * *